(12) United States Patent
Zhou (10) Patent No.: US 8,873,800 B2
(45) Date of Patent: Oct. 28, 2014

(54) IMAGE PROCESSING APPARATUS AND METHOD, AND PROGRAM

(75) Inventor: Ning Zhou, Tokyo (JP)

(73) Assignee: Sony Corporation, Tokyo (JP)

( * ) Notice: Subject to any disclaimer, the term of this patent is extended or adjusted under 35 U.S.C. 154(b) by 765 days.

(21) Appl. No.: 13/156,765

(22) Filed: Jun. 9, 2011

(65) Prior Publication Data

US 2012/0020550 A1 Jan. 26, 2012

(30) Foreign Application Priority Data

Jul. 21, 2010 (JP) .................................. 2010-163588

(51) Int. Cl.
*G06K 9/00* (2006.01)

(52) U.S. Cl.
CPC .................................. *G06K 9/00375* (2013.01)
USPC .............................. 382/103; 382/155; 348/143

(58) Field of Classification Search
None
See application file for complete search history.

(56) References Cited

U.S. PATENT DOCUMENTS

| | | | | |
|---|---|---|---|---|
| 4,737,847 | A * | 4/1988 | Araki et al. | 348/161 |
| 5,048,095 | A * | 9/1991 | Bhanu et al. | 382/173 |
| 5,802,361 | A * | 9/1998 | Wang et al. | 382/217 |
| 5,822,542 | A * | 10/1998 | Smith et al. | 709/247 |
| 5,884,042 | A * | 3/1999 | Winter et al. | 709/231 |
| 6,055,335 | A * | 4/2000 | Ida et al. | 382/232 |
| 6,217,520 | B1 * | 4/2001 | He et al. | 600/467 |
| 6,266,442 | B1 * | 7/2001 | Laumeyer et al. | 382/190 |
| 6,477,272 | B1 * | 11/2002 | Krumm et al. | 382/170 |
| 6,549,661 | B1 * | 4/2003 | Mitsuyama et al. | 382/224 |
| 7,095,878 | B1 * | 8/2006 | Taylor et al. | 382/118 |
| 7,292,256 | B2 * | 11/2007 | Lawther et al. | 345/629 |
| 7,425,955 | B2 * | 9/2008 | Long et al. | 345/421 |
| 7,444,003 | B2 * | 10/2008 | Laumeyer et al. | 382/103 |
| 7,554,603 | B2 * | 6/2009 | Nishi | 348/450 |
| 7,689,034 | B2 * | 3/2010 | Terakawa | 382/159 |
| 7,734,112 | B1 * | 6/2010 | Martel | 382/266 |
| 7,978,917 | B2 * | 7/2011 | Lei et al. | 382/224 |
| 8,103,603 | B2 * | 1/2012 | George et al. | 706/16 |
| 2010/0055654 | A1 * | 3/2010 | Yokono et al. | 434/155 |

FOREIGN PATENT DOCUMENTS

JP 2010-61415 3/2010

OTHER PUBLICATIONS

Navneet Dalal, et al., "Histograms of Oriented Gradients for Human Detection", CVPR, 2005, 8 pages.

* cited by examiner

*Primary Examiner* — Manav Seth
(74) *Attorney, Agent, or Firm* — Oblon, Spivak, McClelland, Maier & Neustadt, L.L.P.

(57) ABSTRACT

The present disclosure provides an image processing apparatus, including: a recognition section adapted to recognize, based on a learning result obtained by learning of a learning image regarding a predetermined object, the object in a predetermined frame of an input image formed from a plurality of frames which are continuous in time; and a setting section adapted to set a parameter to be used for a process to be carried out for a later frame which is later in time than the predetermined frame of the input image in response to a difference in image information between an object image, which is an image in a region of the object recognized in the predetermined frame, and the learning image; the recognition section recognizing the object in the later frame for which the process is carried out based on the parameter set by the setting section.

6 Claims, 10 Drawing Sheets

IMAGE PROCESSING APPARATUS AND METHOD, AND PROGRAM

BACKGROUND

This disclosure relates to an image processing apparatus and method and a program, and more particularly to an image processing apparatus and method and a program by which an object can be detected.

A system is available wherein an object in an input image can be recognized or detected based on recognizers obtained by learning using a learning image regarding a predetermined object or object substance.

In such a system as just described, as a greater number of learning images are used to learn, the object detection accuracy can be improved.

A technique for improving the object detection accuracy even in a case in which the number of learning images is small has been proposed and is disclosed, for example, in Japanese Patent Laid-Open No. 2010-61415. According to the technique, a plurality of recognizers are generated and some of the recognizers are selected, and then a final composite recognizer is generated based on the selected recognizers.

SUMMARY

However, in the case where an environment in which an input image is obtained is different from an environment in which a learning image has been obtained, there is the possibility that the detection accuracy of the object may be much lower than an expected value therefor.

For example, in the case where an illumination environment when a learning image was obtained and an illumination environment when an input image is obtained are different from each other, the images are different in color or brightness. Therefore, there is the possibility that a recognizer obtained by learning may not be effective to detect an object in the input image with a high degree of accuracy.

Therefore, it is desirable to provide an image processing apparatus and method and a program by which an object can be detected with a higher degree of accuracy without depending upon an environment in which the object exists.

According to an embodiment of the technology, there is provided an image processing apparatus including a recognition section adapted to recognize, based on a learning result obtained by learning of a learning image regarding a predetermined object, the object in a predetermined frame of an input image formed from a plurality of frames which are continuous in time, and a setting section adapted to set a parameter to be used for a process to be carried out for a later frame which is later in time than the predetermined frame of the input image in response to a difference in image information between an object image, which is an image in a region of the object recognized in the predetermined frame, and the learning image, the recognition section recognizing the object in the later frame for which the process is carried out based on the parameter set by the setting section.

The image processing apparatus may further include a processing section adapted to carry out a predetermined image process for the input image, the setting section setting an image processing parameter to be used in an image process carried out for the later frame by the processing section in response to the difference in image information between the object image and the learning image, the processing section carrying out the image process for the later frame based on the image processing parameter set by the setting section, the recognition section recognizing the object in the later frame for which the image process is carried out by the processing section.

Or, the image processing apparatus may be configured such that the setting section sets a recognition processing parameter to be used in a recognition process to be carried out for the later frame by the recognition section in response to the difference in image information between the object image and the learning image, the recognition section recognizing the object in the later frame based on the recognition processing parameter set by the setting section.

Or else, the image processing apparatus may further include an image pickup section adapted to pick up an image of an image pickup object to acquire the input image the setting section setting an image pickup parameter relating to image pickup by the image pickup section in response to the difference in image information between the object image and the learning image in the predetermined frame, the image pickup section acquiring the input image based on the image pickup parameter set by the setting section, the recognition section recognizing the object in the later frame acquired by the image pickup section.

According to another embodiment of the technology, there is provided an image processing method for an image processing apparatus which includes a recognition section adapted to recognize, based on a learning result obtained by learning of a learning image regarding a predetermined object, the object in a predetermined frame of an input image, and a setting section adapted to set a parameter to be used for a process to be carried out for a later frame which is later in time than the predetermined frame of the input image in response to a difference in image information between an object image, which is an image in a region of the object recognized in the predetermined frame, and the learning image, including recognizing, by the recognition section, based on the learning result obtained by learning of the learning image regarding the predetermined object, the object in the predetermined frame of the input image, and setting a parameter to be used for a process to be carried out for a later frame which is later in time than the predetermined frame of the input image in response to a difference in image information between an object image, which is an image in a region of the object recognized in the predetermined frame, and the learning image, the object in the later frame for which the process is carried out based on the parameter set by the setting being recognized.

According to a further embodiment of the technology, there is provided a program for causing a computer to execute recognizing, based on a learning result obtained by learning of a learning image regarding a predetermined object, the object in the predetermined frame of the input image, and setting a parameter to be used for a process to be carried out for a later frame which is later in time than the predetermined frame of the input image in response to a difference in image information between an object image, which is an image in a region of the object recognized in the predetermined frame, and the learning image, the object in the later frame for which the process is carried out based on the parameter set by the setting being recognized.

In the image processing apparatus and method and the program, an object of a predetermined frame of an input image is recognized based on a learning result obtained by learning of a learning image regarding the predetermined object. Then, a parameter to be used for a process to be carried out for a later frame which is later in time than the predetermined frame of the input image is set in response to a difference in image information between an object image, which is an image in a region of the object recognized in the predetermined frame, and the learning image. Then, the object in the later frame for which the process is carried out based on the set parameter is recognized.

With the image processing apparatus and method and the program, an object can be detected with a higher degree of accuracy independently of an environment in which the object exits.

DETAILED DESCRIPTION OF THE PREFERRED EMBODIMENTS

In the following, embodiments of the disclosed technology are described with reference to the accompanying drawings. It is to be noted that the description is given in the following order.

1. First Embodiment (configuration wherein an image processing parameter is set in response to a difference between an object image and an average learning image)

2. Second Embodiment (configuration wherein a recognition processing parameter is set in response to a difference between an object image and an average learning image)

3. Third Embodiment (configuration wherein an image pickup parameter is set in response to a difference between an object image and an average learning image)

4. Fourth Embodiment (configuration wherein an image processing parameter, a recognition processing parameter and an image pickup parameter are set in response to a difference between an object image and an average learning image)

<1. First Embodiment>

Configuration of Image Processing Apparatus

Figure 1:
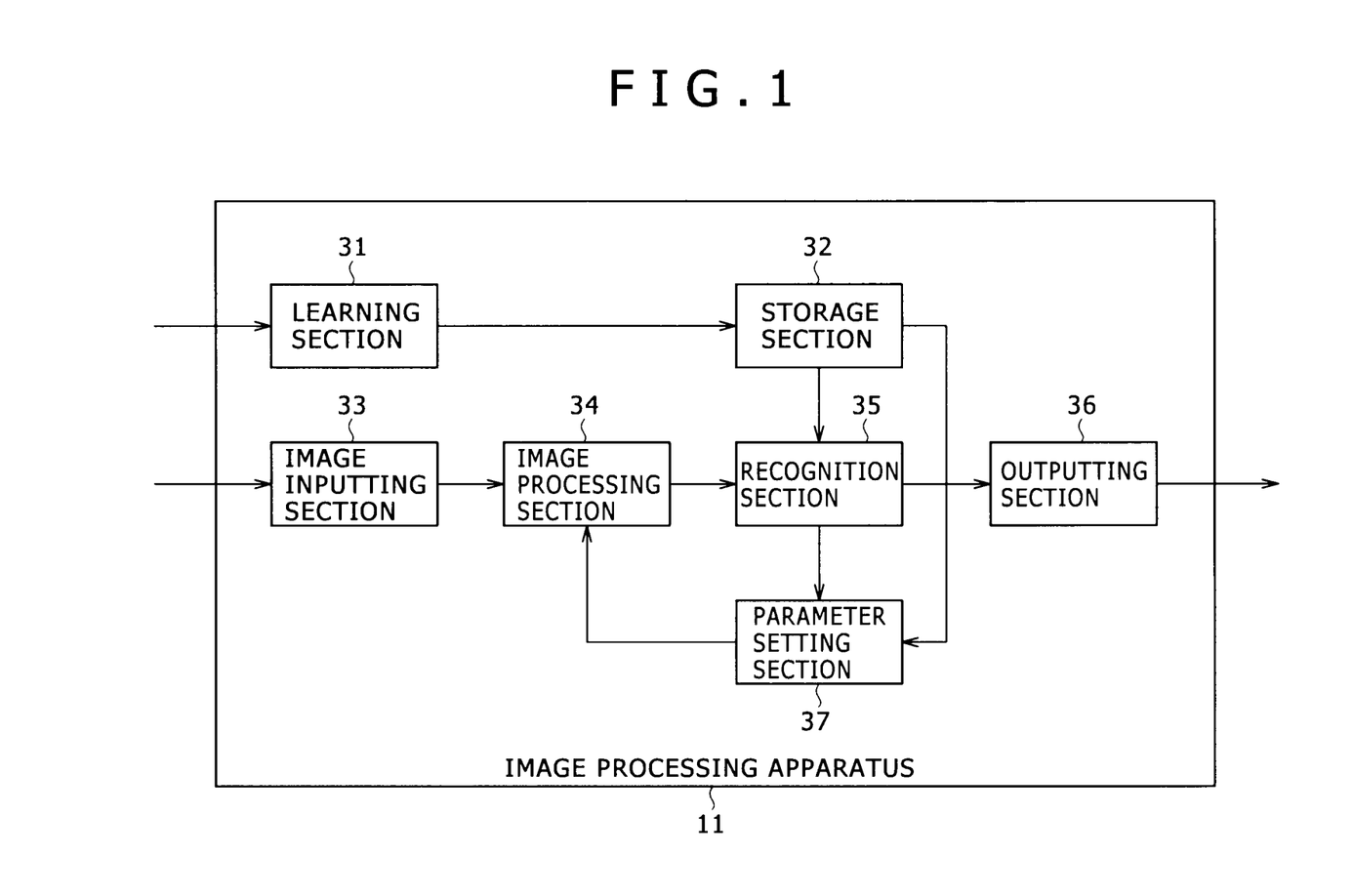
FIG. 1 is a block diagram showing a configuration of an image processing apparatus according to the present disclosure.

FIG. 1 shows a functional configuration of an image processing apparatus to which the disclosed technology is applied.

Referring to FIG. 1, the image processing apparatus 11 detects an object, that is, an object substance, which is, for example, a human being or part of the body of a human being such as the face or a hand from within an image input thereto and outputs the result to the external apparatus.

The image processing apparatus 11 includes a learning section 31, a storage section 32, an image inputting section 33, an image processing section 34, a recognition section 35, an outputting section 36 and a parameter setting section 37.

The learning section 31 extracts, from an input learning image, several pixels of the learning image as characteristic points of a predetermined object on the learning image. The learning section 31 carries out a filter process using, for example, a steerable filter to calculate recognition characteristic amounts representative of the predetermined object and to be used in a process of recognizing presence or absence of an object on the input image. Then, the learning section 31 carries out a statistic learning process, which uses, for example, the AdaBoost algorithm or the Genetic Algorithm (GA), based on the input learning image and the recognition characteristic amounts to generate recognizers for recognition of presence or absence of the predetermined object on the input image in the recognition section 35.

According to the AdaBoost algorithm, a learning image in which an object to be detected is included and a learning image in which the object is not included are used as samples to generate a weak recognizer also called weak leaner. A large number of such weak recognizers are combined to construct a strong recognizer. If the strong recognizer obtained in this manner is used, then an object can be detected from an arbitrary image.

Further, the learning section 31 generates, based on the recognition characteristic amounts, an average learning image which is an average image of the predetermined object on the learning image from an average value of the recognition characteristic amounts. The learning section 31 supplies the generated recognition characteristic amounts, recognizers and average learning image to the storage section 32 so as to be stored into the storage section 32.

The image inputting section 33 supplies an image, which is supplied from an editing apparatus or a recording apparatus not shown and from which an object is to be recognized, as an input image to the image processing section 34.

The image processing section 34 applies a predetermined image process to the input image supplied thereto from the image inputting section 33 and supplies a resulting image to the recognition section 35.

The recognition section 35 carries out a process similar to that of the learning section 31 for an input image from which an object is to be recognized to calculate characteristic amounts representative of a predetermined object on the input image. The recognition section 35 reads out recognition characteristic amounts and recognizers stored in the storage section 32 and recognizes or detects the predetermined object on the input image supplied thereto from the image processing section 34 based on the characteristic amounts and the recognizers corresponding to the recognition characteristic amounts from among the calculated characteristic amounts. The recognition section 35 supplies a result of the recognition of the predetermined object on the input image to the outputting section 36 and the parameter setting section 37.

The outputting section 36 supplies the detection result supplied thereto from the recognition section 35 to a display apparatus or the like not shown.

The parameter setting section 37 reads out an average learning image from the storage section 32 in response to recognition of the predetermined object by the recognition section 35 and compares the average learning image with a region of an object on the input image recognized by the recognition section 35. The parameter setting section 37 sets a parameter to be used in an image process by the image processing section 34 in response to a result of the comparison.

Object Detection Process of the Image Processing Apparatus

Now, an object detection process by the image processing apparatus 11 is described with reference to a flow chart of FIG. 2. The object detection process is started when an image formed from a plurality of frames continuous in time, that is, a moving picture image, is supplied from the editing apparatus or recording apparatus not shown to the image processing apparatus 11. It is to be noted that the image processing apparatus 11 has learned an image of a hand of a human being as a learning image in advance. In other words, by the object detection process described below, a hand of a human being in an input image has been detected.

Figure 2:
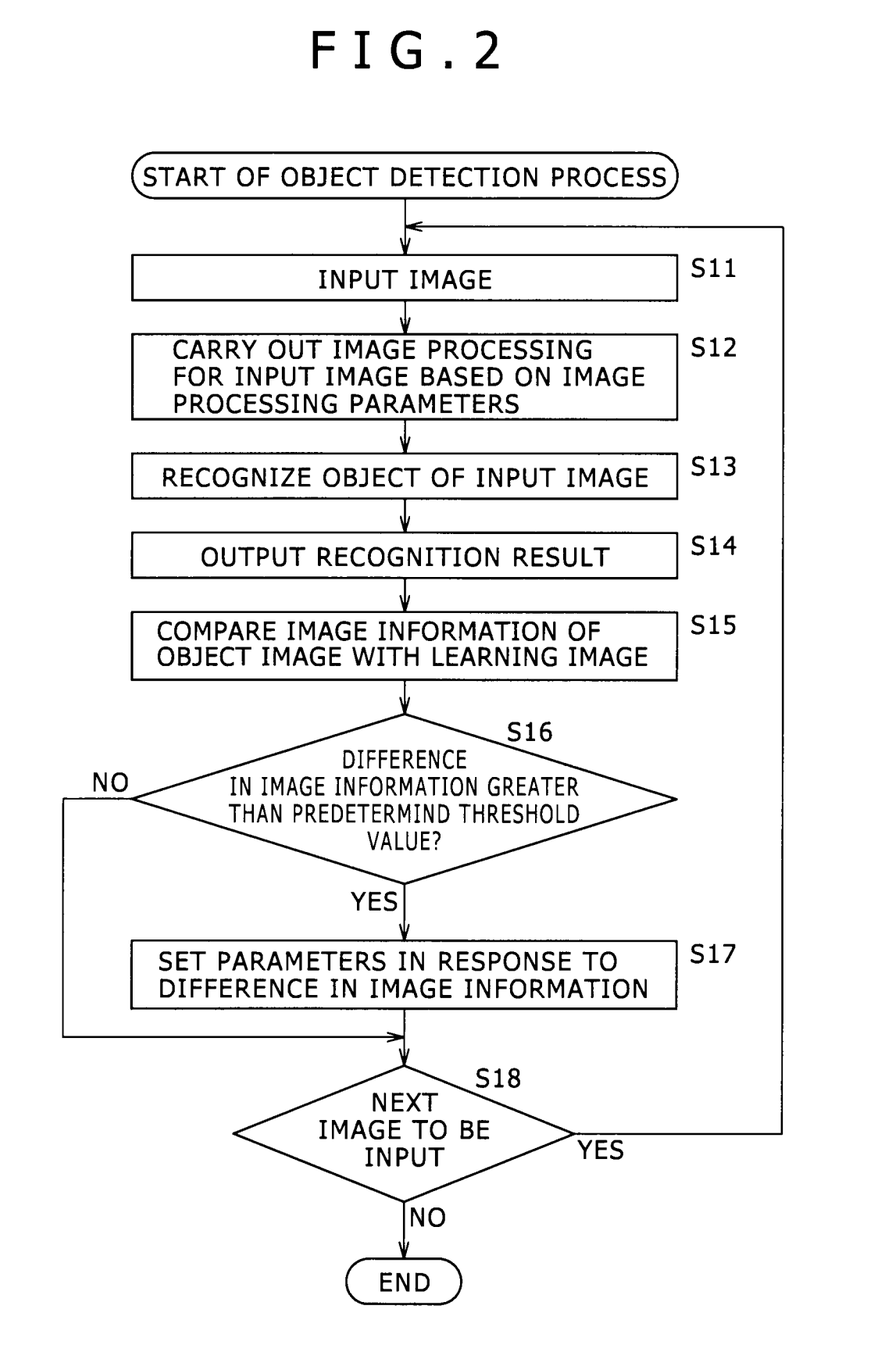
FIG. 2 is a flow chart illustrating an object detection process by the image processing apparatus of FIG. 1.

Referring to FIG. 2, the image inputting section 33 supplies, at step S11, an image which is supplied from the editing apparatus or recording apparatus not shown and from which an object is to be recognized, that is, the first frame of the moving picture image, as an input image to the image processing section 34.

At step S12, the image processing section 34 carries out a predetermined image process for the first frame of the input image supplied thereto from the image inputting section 33 based on an image processing parameter, which is a parameter for image processing determined in advance. Then, the image processing section 34 supplies a resulting image to the recognition section 35.

At step S13, the recognition section 35 carries out a filter process using, for example, a steerable filter based on an input image to calculate characteristic amounts representative of an object on the input image. Further, the recognition section 35 reads out the recognition characteristic amounts and recognizers stored in the storage section 32. Then, the recognition section 35 recognizes an object on the input image supplied thereto from the image processing section 34 based on those characteristic amounts and recognizers corresponding to the read out recognition characteristic amounts from among the calculated characteristic amounts. The recognition section 35 supplies a result of the recognition of the object on the input image to the outputting section 36 and the parameter setting section 37 together with the input image.

It is to be noted that, as a technique for recognizing an object, a technique of recognizing an object based on a HOG (Histograms of Oriented Gradients) proposed by N. Dalal et al., of INRIA, France and an SVM (Support Vector Machine) (refer to "Histograms of Oriented Gradients for Human Detection", CVPR, 2005) or a like technique may be used.

Figure 3:
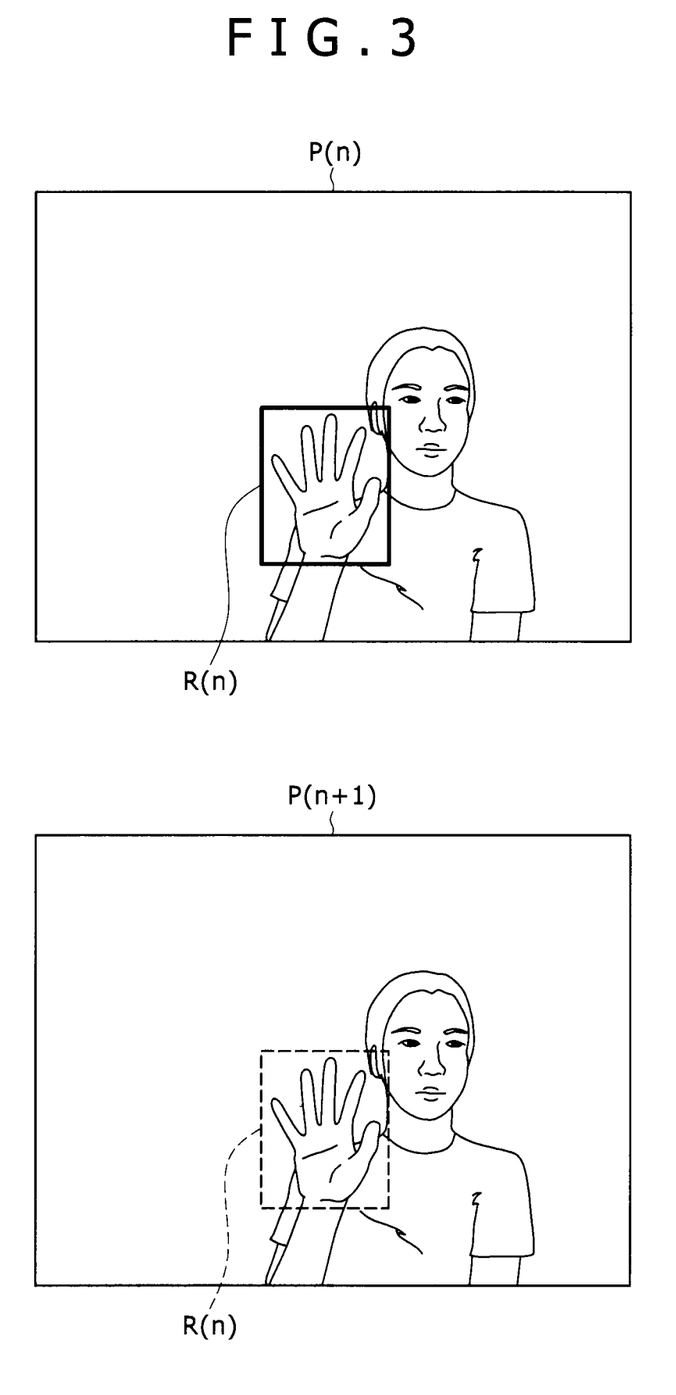
FIG. 3 is a schematic view showing an example of an input image.

FIG. 3 shows an example of an input image.

Referring to FIG. 3, an input image P(n) shown on the upper side is an image of the nth frame from among input images of a plurality of frames which are continuous in time, and it is assumed here that n=1. In the input image P(1) which is an input image of the first frame, a person who is an image pickup object opens its hand. Meanwhile, another input image P(n+1) shown on the lower side in FIG. 3 is an image of the (n+1)th frame which is later in time than the image of the nth frame.

In regard to such an input image P(1) as described above, the recognition section 35 recognizes the hand on the input image P(1) based on recognition characteristic amounts and recognizers regarding a hand of a human being. The recognition section 35 supplies displaying information of a framework R(1) which surrounds the hand of the human being as the object shown on the input image P(1) of FIG. 3 as a result of the recognition of the hand on the input image P(1) to the outputting section 36 and the parameter setting section 37 together with the input image P(1).

At step S14, the outputting section 36 supplies the input image P(1) and the recognition result, which is displaying information for the framework R(1), supplied thereto from the recognition section 35 to the display apparatus or the like not shown. Consequently, the display apparatus not shown displays such an image wherein the hand which is the recognized object is surrounded by a framework as shown on the upper side in FIG. 3.

At step S15, when the input image and the recognition result are supplied from the recognition section 35, the parameter setting section 37 reads out the average learning image from the storage section 32 and compares the image information of the image in the region of the object of the input image recognized by the recognition section 35, that is, in the region of the framework R(1) (the image in the region described is hereinafter referred to as object image) and the image information of the average learning image with each other. In particular, the parameter setting section 37 compares luminance information and color information between the object image and the average learning image for each pixel.

At step S16, the parameter setting section 37 decides whether or not the difference in image information between the object image and the average learning image is greater than a predetermined threshold value. In particular, the parameter setting section 37 decides whether or not the difference in luminance information and the difference in color information between the object image and the average learning image are greater than respective threshold values determined in advance.

Here, it is assumed that the object image, that is, the image in the region of the hand, of the input image P(1) shown on the upper side in FIG. 3 is sufficiently dark in comparison with the average learning image. Consequently, if it is decided at step S16 that the difference in image information is greater than the predetermined threshold value, or in other words, if it is decided that both of the difference in luminance information and the difference in color information between the object image and the average learning image are greater than the respective threshold values, then the processing advances to step S17.

At step S17, the parameter setting section 37 sets or updates an image processing parameter to be used in the image process by the image processing section 34 in response to the differences in image information and supplies the image processing parameter to the image processing section 34. In particular, the parameter setting section 37 sets an image processing parameter with which the image processing section 34 carries out such an image process as to cause the luminance information and the color information of the object image to approach the luminance information and the color information of the average learning image. Then, the parameter setting section 37 supplies the set image processing parameter to the image processing section 34.

At step S18, the image inputting section 33 decides whether or not a next input image, that is, an image of the second frame, is to be input.

If it is decided at step S18 that a next input image is to be input, then the processing returns to step S11 so that the processes at the steps beginning with step S11 are executed for the input image of the second frame.

At step S11 for the second time, the image inputting section 33 supplies the image supplied from the editing apparatus, recording apparatus or the like not shown, that is, the image of the second frame of the moving picture image, as an input image to the image processing section 34.

At step S12 for the second time, the image processing section 34 carries out an image process for the input image P(2) of the second frame, that is, the input image P(n+1) whose n is n=1, supplied from the image inputting section 33 and illustrated on the lower side in FIG. 3, based on the image processing parameter. Then, the image processing section 34 supplies a resulting image to the recognition section 35.

Here, since the image processing parameter was set or updated by the parameter setting section 37 at step S17 for the first time, the image processing section 34 carries out an image process for the input image P(2) of the second frame based on the image processing parameter set formerly. In particular, the image processing section 34 carries out an image process for the input image based on the newly set image processing parameter so that the luminance information and the color information of the object image on the input image P(2) of the second frame approach the luminance information and the color information of the average learning image stored in the storage section 32, respectively.

In particular, the parameter setting section 37 sets the image processing parameter as a projection function for causing the center of gravity, maximum value and minimum value of a luminance histogram of the object image to match with the center of gravity, maximum value and minimum value of a luminance histogram of the average learning image, respectively. The image processing section 34 carries out an image process for the input image of the second frame using the set projection function.

Further, the parameter setting section 37 sets an image processing parameter as a projection function for causing an average color of the object image to match with an average color of the average learning image, and the image processing section 34 uses the set projection function to carry out an image process for the input image of the second frame. Here, white balance correction may additionally be carried out for the input image in response to the image processing parameter set by the parameter setting section 37. It is to be noted that the processing for the color information is omitted in the case where the input image is a gray scale image.

Here, although the image processing section 34 may be configured such that an image process is carried out for the entire image based on the updated image processing parameter, also it is possible to configure the image processing section 34 such that it acquires coordinate information representative of the position of the object image of the preceding input image P(n), which is a portion of the object image in the region of the framework R(n), from the parameter setting section 37 and carries out an image process only for a region of the input image P(n+1) of the current frame corresponding to the coordinate information, that is, a region indicated by broken lines of the input image P(n+1) of FIG. 3. This makes it possible to suppress the mathematic operation amount in the image process.

At step S13 for the second time, the recognition section 35 reads out the recognition characteristic amount and the recognizer stored in the storage section 32 and recognizes the object on the input image for the second frame supplied from the image processing section 34 based on the read out recognition characteristic amount and recognizer. The recognition section 35 supplies a result of the recognition of the object on the input image to the outputting section 36 and the parameter setting section 37 together with the input image.

In particular, the recognition section 35 recognizes the hand on the input image P(2) and supplies displaying information of a framework R(2) not shown surrounding the recognized hand on the input image P(2) as a result of the recognition result to the outputting section 36 and the parameter setting section 37 together with the input image P(2).

At step S14 for the second time, the outputting section 36 supplies the input image P(2) and the recognition result, which is displaying information of the framework R(2), supplied thereto from the recognition section 35 to the display apparatus or the like not shown.

At step S15 for the second time, when the input image and the recognition result are supplied from the recognition section 35, the parameter setting section 37 reads out the average learning image and compares the image information of the object image on the input image and the image information of the average learning image with each other.

At step S16 for the second time, the parameter setting section 37 decides whether or not the differences in image information between the object image and the average learning image are greater than the predetermined threshold values. In particular, the parameter setting section 37 decides whether or not the difference in luminance information and the difference in color information between the object image and the average learning image are greater than the respective threshold values.

Here, if it is assumed that the object image of the input image P(2), that is, the region of the hand, still is a sufficiently dark image in comparison with the average learning image, then also at step S16 for the second time, it is decided that the difference in image information is greater than the predetermined threshold value. In other words, it is decided that both of the difference in luminance information and the difference in color information between the object image and the average learning image are greater than the respective threshold values. Consequently, the processing advances to step S17 for the second time.

At step S17 for the second time, the parameter setting section 37 sets or updates an image processing parameter to be used for an image process by the image processing section 34 in response to the difference in image information and supplies the set or updated image processing parameter to the image processing section 34. In particular, the parameter setting section 37 sets such an image processing parameter with which an image process for causing both of the luminance information and the color information of the object image to approach the luminance information and the color information of the average learning image, respectively, is carried out. Then, the parameter setting section 37 supplies the set image processing parameter to the image processing section 34.

In this manner, if it is decided at step S16 that the difference in image information is greater than the predetermined threshold value, then such an image processing parameter with which an image process for causing the image information of the object image to approach the image information of the average learning image is set at step S17. Then, while it is decided at step S18 that a next input image or next frame is to be input, then the processes at steps S11 to S18 are repeated.

Incidentally, if it is decided at step S16 that the differences in image information between the object image and the average learning image are not greater than the predetermined threshold values, or in other words, if it is decided that the difference in luminance information or the difference in color information between the object image and the average learning image is not greater than the corresponding threshold value, then the process at step S17 is skipped and the processing advances to step S18.

Then, if it is decided at step S18 that a next input image is not to be input, that is, if no more image is supplied from the editing apparatus, recording apparatus or the like not shown, then the processing is ended.

With the process described above, while the difference in image information between the object image of a predetermined frame of an input image and the average learning image remains greater than the predetermined threshold value, an image processing parameter is set so that an image process of decreasing the difference in image information between an object image of a next frame of the input image and the average learning image is carried out. Consequently, for a next frame of the input image, such an image process as to cause the image information of the object image on the next frame to approach the image information of the average learning image is carried out. As a result, since the difference between the image information of the object image and the image information of the average learning image decreases, the recognition accuracy of the object can be enhanced. Further, since such an image process as to cause the image information of the object image to approach the image information of the average learning image is carried out, it is not necessary to carry out, for example, learning for a learning image having luminance information or color information corresponding to various illumination environments. In this manner, it becomes possible to detect an object with a higher degree of accuracy independently of a situation in which the object exists.

In the foregoing description, the configuration for reducing the difference between image information of an object image and image information of the average learning image by carrying out such an image process as to cause the image information of the object image on an input image to approach the image information of the average learning image is described. In the following, a configuration for reducing the difference between image information of an object image and image information of an average learning image by carrying out such a recognition process as to cause image information of an object image on an input image to approach image information of an average learning image is described.

<2. Second Embodiment>

Configuration of the Image Processing Apparatus

Figure 4:
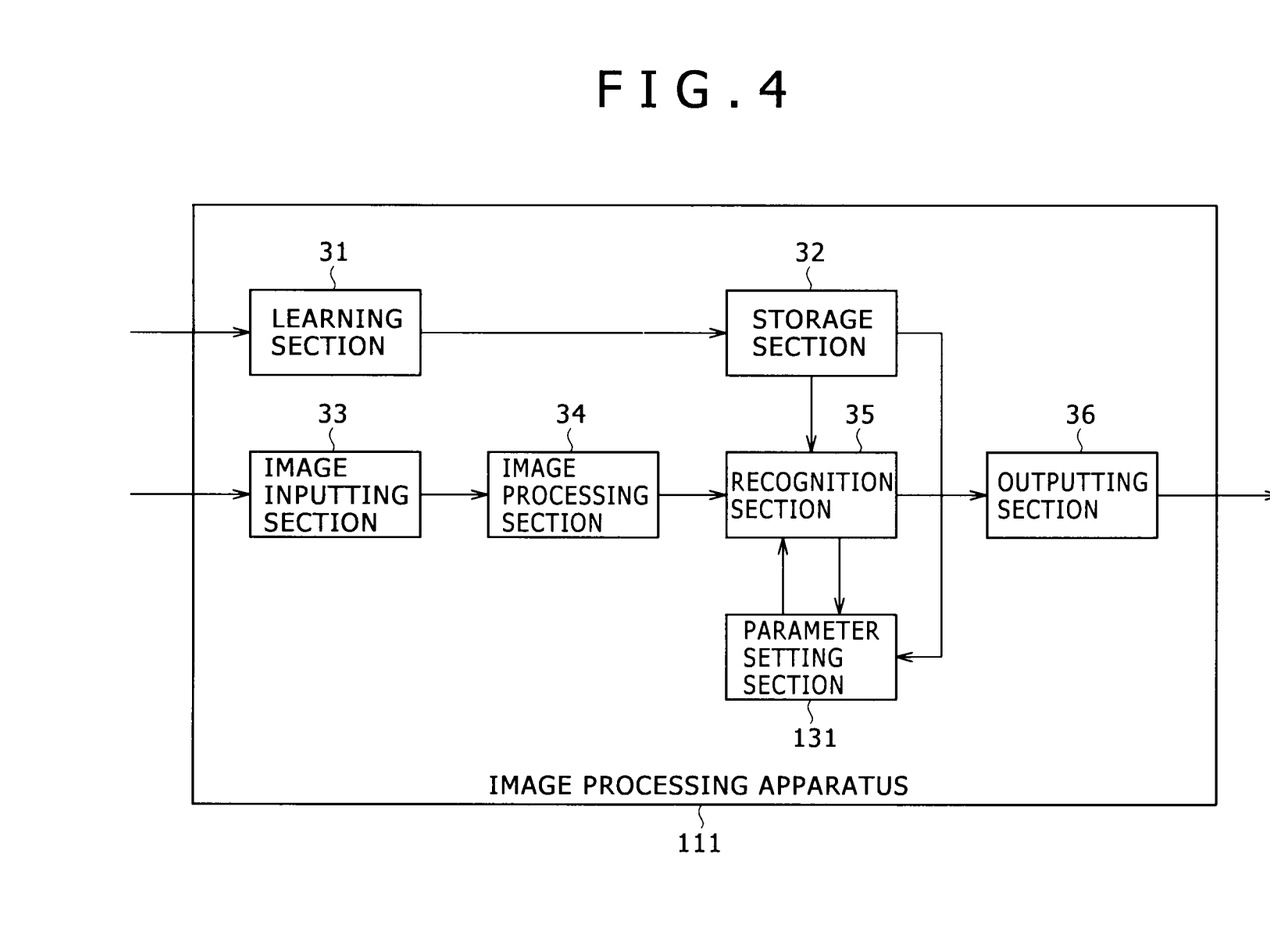
FIG. 4 is a block diagram showing another configuration of the image processing apparatus according to the present disclosure.

FIG. 4 shows an example of a functional configuration of an image processing apparatus according to a second embodiment of the disclosed technology wherein such a recognition process as to cause image information of an object image on an input image to approach image information of an average learning image is carried out.

Referring to FIG. 4, the image processing apparatus 111 shown includes a learning section 31, a storage section 32, an image inputting section 33, an image processing section 34, a recognition section 35, an outputting section 36, and a parameter setting section 131.

It is to be noted that, while several components of the image processing apparatus 111 of FIG. 4 are common to those of the image processing apparatus 11 of FIG. 1, overlapping description of such common components is omitted herein to avoid redundancy.

In particular, the image processing apparatus 111 of FIG. 4 is different from the image processing apparatus 11 of FIG. 1 in that it includes the parameter setting section 131 in place of the parameter setting section 37.

The parameter setting section 131 reads out an average learning image from the storage section 32 in response to recognition of a predetermined object by the recognition section 35 and compares the read out average learning image on the input image with a region of an object recognized by the recognition section 35. The parameter setting section 131 sets a parameter to be used for a recognition process by the recognition section 35 in response to a result of the comparison.

Object Detection Process of the Image Processing Apparatus

Now, an object detection process of the image processing apparatus 111 is described with reference to a flow chart of FIG. 5.

Figure 5:
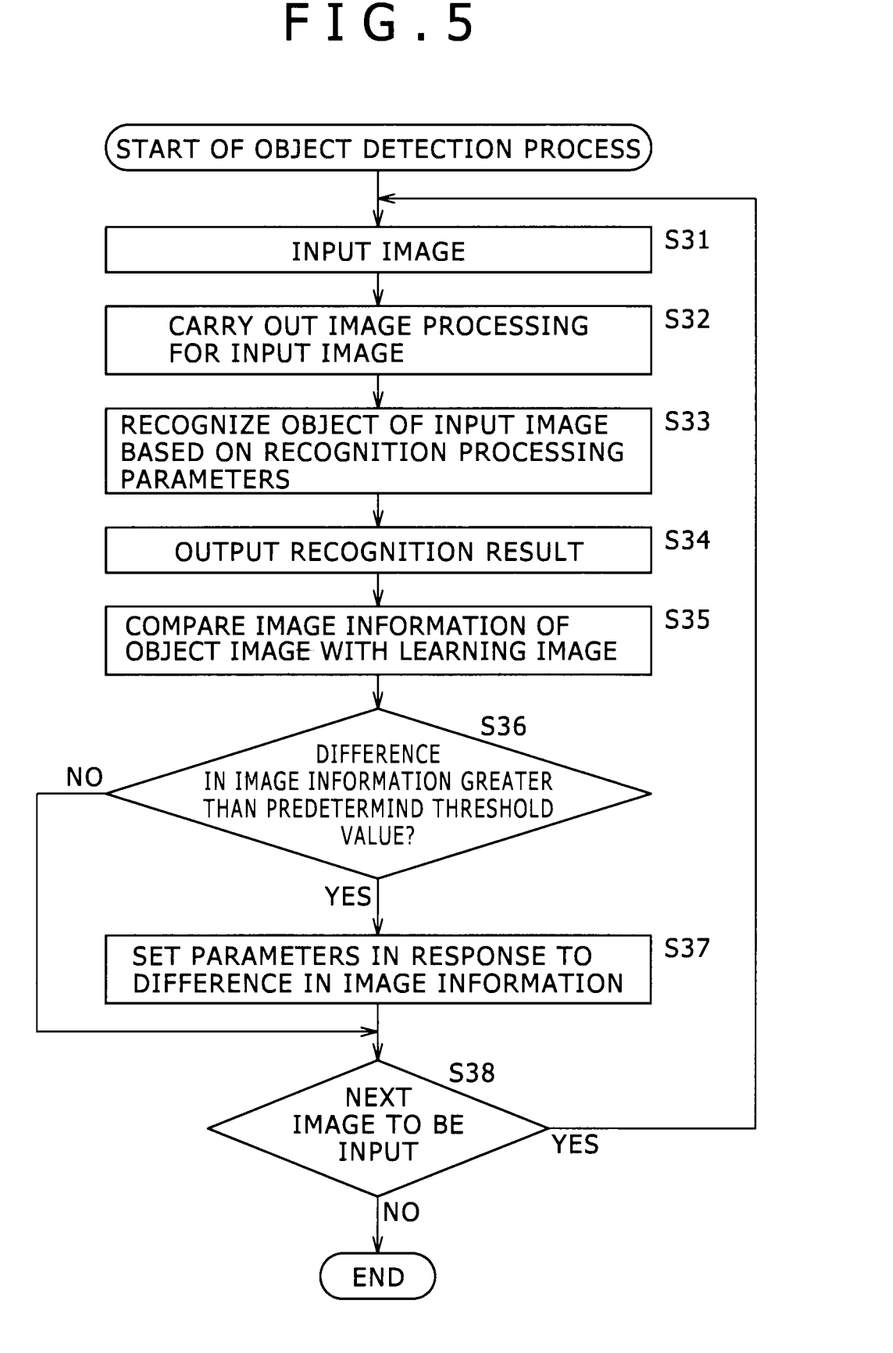
FIG. 5 is a flow chart illustrating an object detection process by the image processing apparatus of FIG. 4.

It is to be noted that processes at steps S31 to S36 for the first time of the flow chart of FIG. 5, that is, for an input image for the first frame, are basically similar to those at steps S11 to S16 for the first time of the flow chart of FIG. 2, respectively. Therefore, description of the processes at steps S31 to S36 is omitted herein.

If it is decided at step S36 that the difference in image information is greater than the predetermined threshold value, that is, if both of the difference in luminance information and the difference in color information between the object image and the average learning image are greater than the respective threshold values, then the processing advances to step S37.

At step S37, the parameter setting section 131 sets a recognition processing parameter to be used in a recognition process by the recognition section 35 in response to the difference in image information and supplies the recognition processing parameter to the recognition section 35. In particular, for example, the parameter setting section 131 sets a recognition processing parameter which causes both of the luminance information and the color information as characteristic amounts of the object image to approach luminance information and color information as recognition characteristic amounts to be used by the recognition section 35 to carry out a recognition process. Then, the parameter setting section 131 supplies the recognition processing parameter to the recognition section 35.

At step S38, the image inputting section 33 decides whether or not a next input image, that is, an input image for the second frame, is to be input.

If it is decided at step S38 that a next input image is to be input, then the processing returns to step S31 so that the processes at the steps beginning with step S31 are carried out for the input image of the second frame.

At step S31 for the second time, the image inputting section 33 supplies an image supplied thereto from the editing apparatus, recording apparatus or the like not shown, that is, an image for the second frame of the moving picture image, as an input image to the image processing section 34.

At step S32 for the second time, the image processing section 34 carries out a predetermined image process for the input image for the second frame supplied thereto from the image inputting section 33 based on the image processing parameter set in advance, and supplies a resulting image to the recognition section 35.

At step S32 for the second time, the recognition section 35 recognizes, based on the input image, a predetermined object on the input image for the second frame supplied thereto from the image processing section 34. The recognition section 35 supplies a result of the recognition of the object on the input image to the outputting section 36 and the parameter setting section 131 together with the input image.

Here, since the recognition processing parameter was set by the parameter setting section 131 at step S37 for the first time, the recognition section 35 carries out a recognition process for the input image for the second frame based on the set recognition processing parameter. In particular, the recognition section 35 causes luminance information and color information as characteristic amounts of an object image on the input image for the second frame to approach the luminance information and the color information as characteristic amounts for recognition stored in the storage section 32, respectively, based on the newly set recognition processing parameter to carry out a recognition process for the input image.

At step S34 for the second time, the outputting section 36 supplies the input image and the recognition result, which is displaying information of a framework surrounding the recognized object, supplied thereto from the recognition section 35 to the display apparatus or the like not shown.

At step S35 for the second time, when the input image and the recognition result are supplied from the recognition section 35, the parameter setting section 131 reads out the average learning image from the storage section 32 and compares image information of the object image on the input image and the average learning image with each other.

At step S36 for the second time, the parameter setting section 131 decides whether or not the difference in image information between the object image and the average learning image is greater than the predetermined threshold value. In particular, the parameter setting section 131 decides whether or not both of the difference in luminance information and the difference in color information between the object image and the average learning image are greater than the respective threshold values.

If it is decided here that both of the difference in luminance information and the difference in color information between the object image and the average learning image are greater than the respective threshold values, then the processing advances to step S37 for the second time.

At step S37 for the second time, the parameter setting section 131 sets a recognition processing parameter to be used in a recognition process by the recognition section 35 in response to the difference in image information and supplies the set recognition processing parameter to the recognition section 35.

In this manner, if it is decided at step S36 that the differences in image information are greater than the predetermined threshold value, then such a recognition processing parameter with which a recognition process for causing the image information as a characteristic amount of the object image to approach the image information as a characteristic amount for recognition is set at step S37. Then, while it is decided at step S38 that a next input image or next frame is to be input, then the processes at steps S31 to S38 are repeated.

Incidentally, if it is decided at step S36 that the differences in image information between the object image and the average learning image are not greater than the predetermined threshold values, or in other words, if it is decided that the difference in luminance information or the difference in color information between the object image and the average learning image is not greater than the corresponding threshold value, then the process at step S37 is skipped and the processing advances to step S38.

Then, if it is decided at step S38 that a next input image is not to be input, that is, if no more image is supplied from the editing apparatus, recording apparatus or the like not shown, then the processing is ended.

With the process described above, while the differences in image information between the object image of a predetermined frame of an input image and the average learning image remain greater than the predetermined threshold value, a recognition processing parameter is set so that a recognition process of decreasing the difference in image information between an object image of a next frame of the input image and the average learning image is carried out. Consequently, for a next frame of the input image, such a recognition process as to cause the image information as characteristic amounts of the object image on the next frame to approach the image information as characteristic amounts for recognition is carried out. As a result, since the difference between the image information of the object image and the image information of the average learning image decreases, the recognition accuracy of the object can be enhanced. Further, since such an image process as to cause the image information of the object image to approach the image information of the average learning image is carried out, it is not necessary to carry out, for example, learning for a learning image having luminance information or color information corresponding to various illumination environments. In this manner, it becomes possible to detect an object with a higher degree of accuracy independently of an environment in which the object exists.

It is to be noted that, although, in the foregoing description, image information as a characteristic amount of an object image on an input image is caused to approach image information as a characteristic amount for recognition, image information as a characteristic information for recognition may conversely be caused to approach image information as a characteristic information of an object image on an input image.

Further, in the foregoing description, an image processing apparatus which detects an object of a moving picture image supplied from an editing apparatus or a recording apparatus not shown is configured such that a predetermined processing parameter is set or updated in response to a difference in image information between an object image on an input image of the moving picture image and an average learning image. However, in the following description, a configuration of an image pickup apparatus, which includes an image pickup section for picking up an image of an image pickup object, for setting an image pickup parameter of an image pickup section in response to a difference in image information between an object image on an image acquired by the image pickup section and an average learning image is described.

<3. Third Embodiment>

Configuration of the Image Pickup Apparatus

Figure 6:
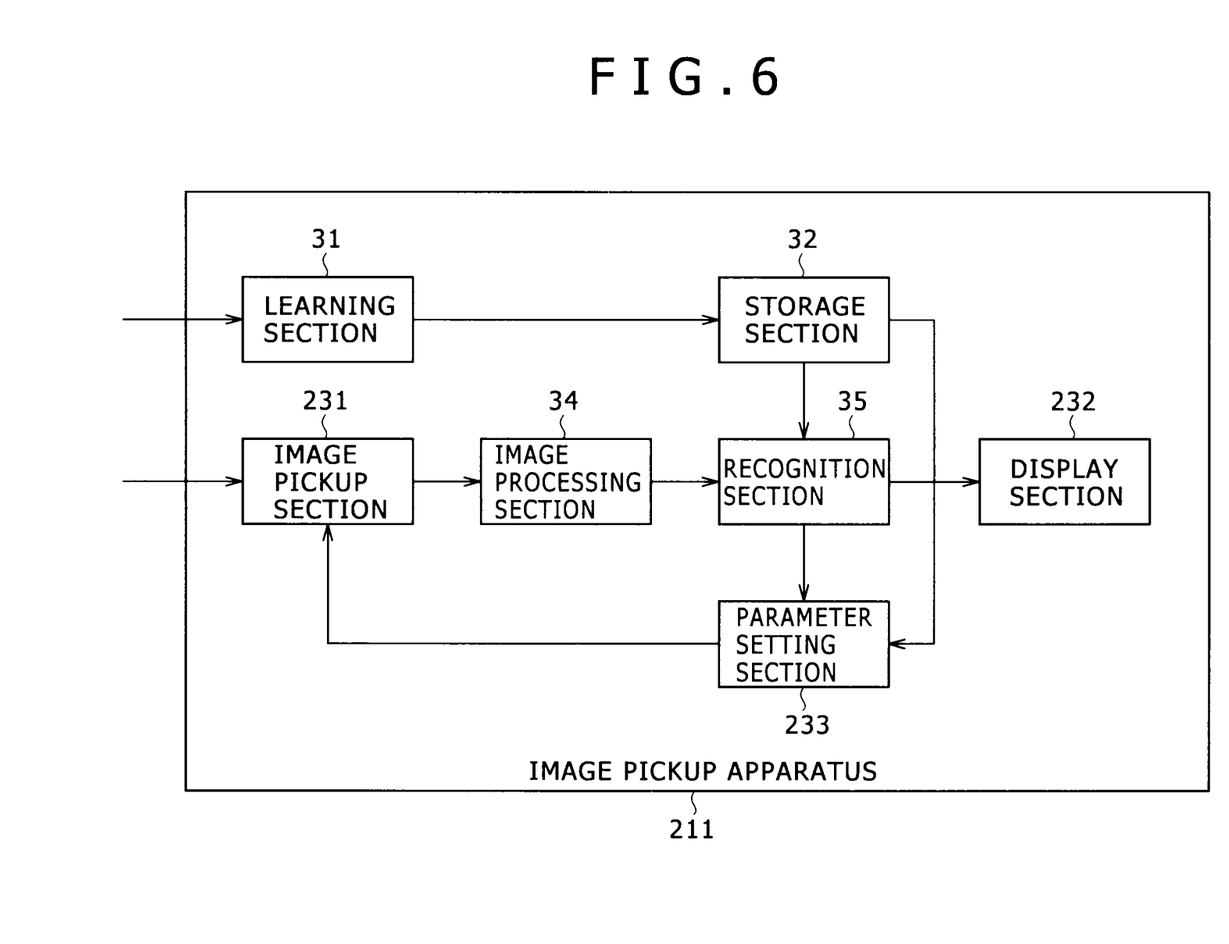
FIG. 6 is a block diagram showing a configuration of an image pickup apparatus according to the present disclosure.

FIG. 6 shows a functional configuration of an image pickup apparatus according to a third embodiment of the disclosed technology wherein an image pickup parameter of an image pickup section is set in response to a difference in image information between an object image on an image acquired by an image pickup section and an average learning image.

Referring to FIG. 6, the image pickup apparatus 211 shown includes a learning section 31, a storage section 32, an image processing section 34, a recognition section 35, an image pickup section 231, a display section 232, and a parameter setting section 233.

It is to be noted that, while several components of the image processing apparatus 211 of FIG. 6 are common to those of the image processing apparatus 11 of FIG. 1, overlapping description of such common components is omitted herein to avoid redundancy.

In particular, the image pickup apparatus 211 of FIG. 6 is different from the image processing apparatus 11 of FIG. 1 in that it includes the image pickup section 231, display section 232 and parameter setting section 233 in place of the image inputting section 33, outputting section 36 and parameter setting section 37.

The image pickup section 231 includes an optical section including optical elements such as, for example, a lens, an iris and a mechanical shutter, and a photoelectric element such as a CCD (Charge Coupled Device) sensor or a CMOS (Complementary Metal Oxide Semiconductor) sensor. The image pickup section 231 carries out adjustment of a focal position or exposure for the optical system under the control of a control section not shown. Further, the image pickup section 231 photoelectrically converts incident light supplied thereto through the optical section by means of a photoelectric element to produce image data. The image pickup section 231 supplies the produced image data as an input image to the image processing section 34.

The display section 232 displays an input image supplied thereto from the image processing section 34 through the recognition section 35 as a through image, which is a real-time image, under the control of the control section not shown. The user can confirm the through image displayed on the real time basis on the display section 232 to determine a composition of an image to be picked up and carry out a shutter operation to pick up an image and then store the picked up image on a recording medium not shown.

The parameter setting section 233 reads out the average learning image from the storage section 32 in response to recognition of a predetermined object by the recognition section 35 and compares the average learning image with a region of the object on the input image recognized by the recognition section 35. The parameter setting section 233 sets an image pickup parameter for image pickup by the image pickup section 231 in response to a result of the comparison.

Object Detection Process of the Image Pickup Apparatus

Now, an object detection process of the image pickup apparatus 211 is described with reference to a flow chart of FIG. 7. If an image pickup mode is selected by an operation of the user, then the image pickup apparatus 211 establishes an image pickup mode in which the image pickup apparatus 211 can pick up an image and starts the object detection process. It is to be noted that, similarly to the image processing apparatus 11 and the image processing apparatus 111, the image pickup apparatus 211 learns an image of a hand of a human being as a learning image in advance.

Figure 7:
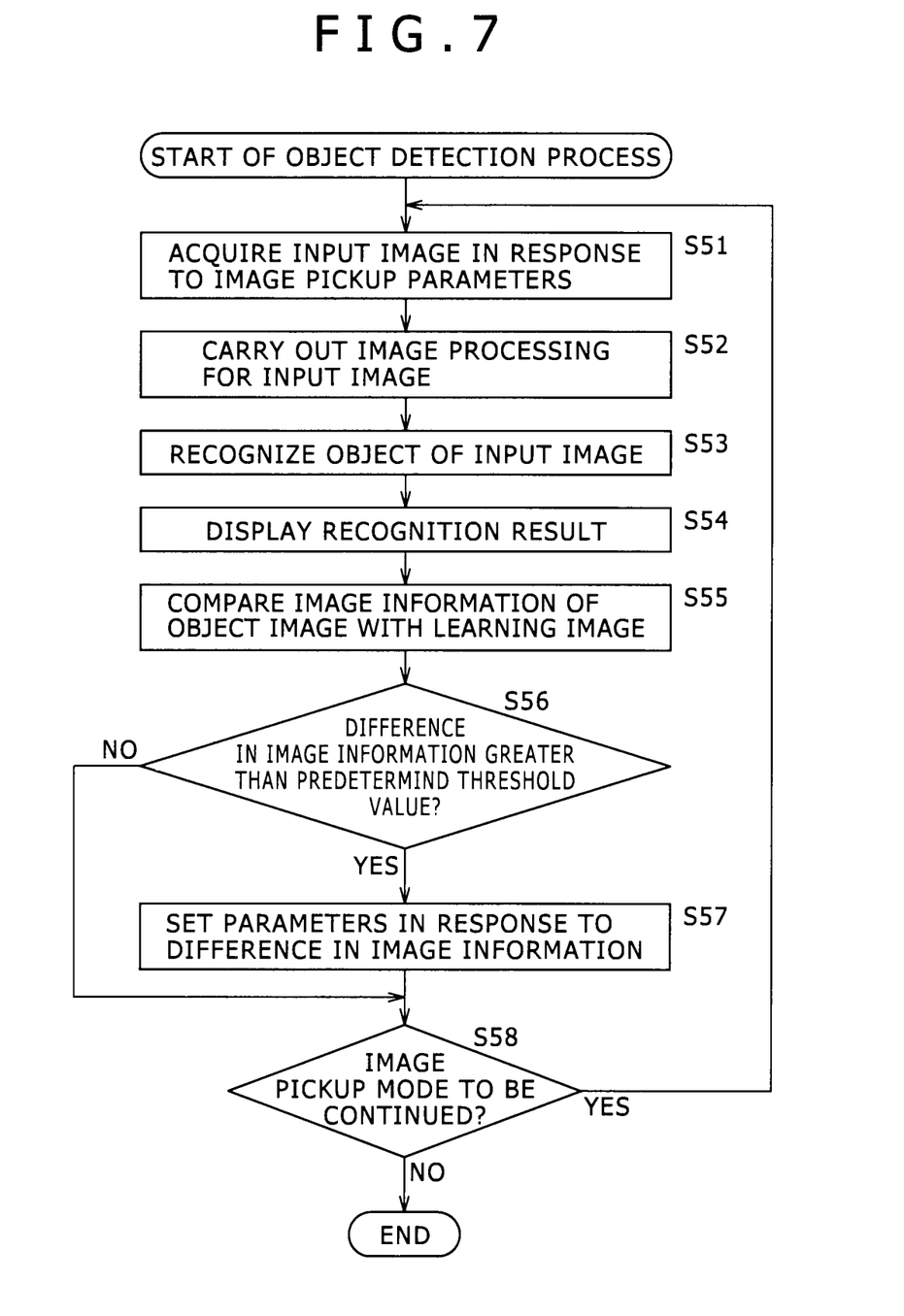
FIG. 7 is a flow chart illustrating an object detection process by the image pickup apparatus of FIG. 6.

It is to be noted that processes at steps S52 to S56 of the flow chart of FIG. 7 are basically similar to those at steps S12 to S16 of the flow chart of FIG. 2, and therefore, overlapping description of them is omitted herein to avoid redundancy.

At step S51, the image pickup section 231 acquires image data produced in response to an image parameter set in response to an operation of the user, an automatic exposure function or the like as an input image of the first frame and supplies the input image to the image processing section 34.

It is to be noted that, at step S54, the display section 232 displays the input image and the recognition result, which is displaying information of a framework surrounding the recognized object, supplied thereto from the recognition section 35. Consequently, the user can confirm the recognized object together with the through image displayed on the display section 232.

Now, if it is decided at step S56 that the difference in image information is greater than the predetermined threshold value, that is, if it is decided that the difference in luminance information between the object image and the average learning image is greater than the threshold value determined in advance, then the processing advances to step S57.

At step S57, the parameter setting section 233 sets an image pickup parameter for the image pickup section 231 in response to the difference in image information and supplies the image pickup parameter to the image pickup section 231. In particular, the parameter setting section 233 sets such an image pickup parameter with which the luminance information of the object image on the input image is caused to approach the luminance information of the average learning image and supplies the image pickup parameter to the image pickup section 231.

At step S58, the learning section 31 decides whether or not the image pickup mode is to continue and a next input image of the second frame is to be acquired by the image pickup section 231.

If it is decided at step S58 that the image pickup mode is to continue, then the processing returns to step S51 to execute the processes at the steps beginning with step S51.

At step S51 for the second time, the image pickup section 231 supplies the image data for the second frame produced in response to the image pickup parameter as input image to the image processing section 34.

Here, since the image pickup parameter was set by the parameter setting section 233 at step S57 for the first time, the image pickup section 231 adjusts the iris based on the set image pickup parameter, acquires image data produced here as an input image for the second frame, and supplies the input image for the second frame to the image processing section 34. In particular, the image pickup section 231 acquires an input image based on the set image pickup parameter so that the luminance information of the object image on the input image of the second frame may approach the luminance information of the average learning image.

Then, processes at the steps beginning with step S52 for the second time are carried out similarly to those for the first time.

If it is decided at step S56 that the difference in image information is greater than the predetermined threshold value in this manner, then an image pickup parameter with which the image information of the object image approaches the image information of the average learning image is set at step S57. Then, the processes at steps S51 to S58 are repeated while it is decided at step S58 that the image pickup mode is to continue.

On the other hand, if it is decided at step S56 that the difference in image information between the object image and the average learning image is not greater than the threshold value, that is, if it is decided that the difference in luminance information between the object image and the average learning image is not greater than the threshold value therefor, then the process at step S57 is skipped and the processing advances directly to step S58.

Then, if it is decided at step S58 that the image pickup mode is not to continue, for example, if an instruction to end the image pickup mode is issued by an operation of the user or in a like case, then the processing is ended.

With the process described above, while the difference in image information between the object image of a predetermined frame of an input image and the average learning image remains greater than the predetermined threshold value, an image pickup parameter is set so that image pickup in which the difference in image information between an object image of a next frame of the input image and the average learning image is reduced is carried out. Consequently, for a next frame of the input image, such image pickup as to cause the image information of the object image on the next frame to approach the image information of the average learning image is carried out. As a result, since the difference between the image information of the object image and the image information of the average learning image decreases, the recognition accuracy of the object can be enhanced. Further, since such an image process as to cause the image information of the object image to approach the image information of the average learning image is carried out, it is not necessary to carry out, for example, learning for a learning image having luminance information corresponding to various illumination environments. In this manner, it becomes possible to detect an object with a higher degree of accuracy independently of an environment in which the object exists.

In the foregoing description, an image processing apparatus which includes an image pickup section for picking up an image of an image pickup object is configured such that an image pickup parameter for the image pickup section is set in response to a difference in image information between an object image on an input image acquired by the image pickup section and an average learning image. However, an image processing parameter or a recognition processing parameter may be set in addition to an image pickup parameter in response to a difference in image information between an object image and an average learning image.

<4. Fourth Embodiment>

Configuration of the Image Pickup Apparatus

Figure 8:
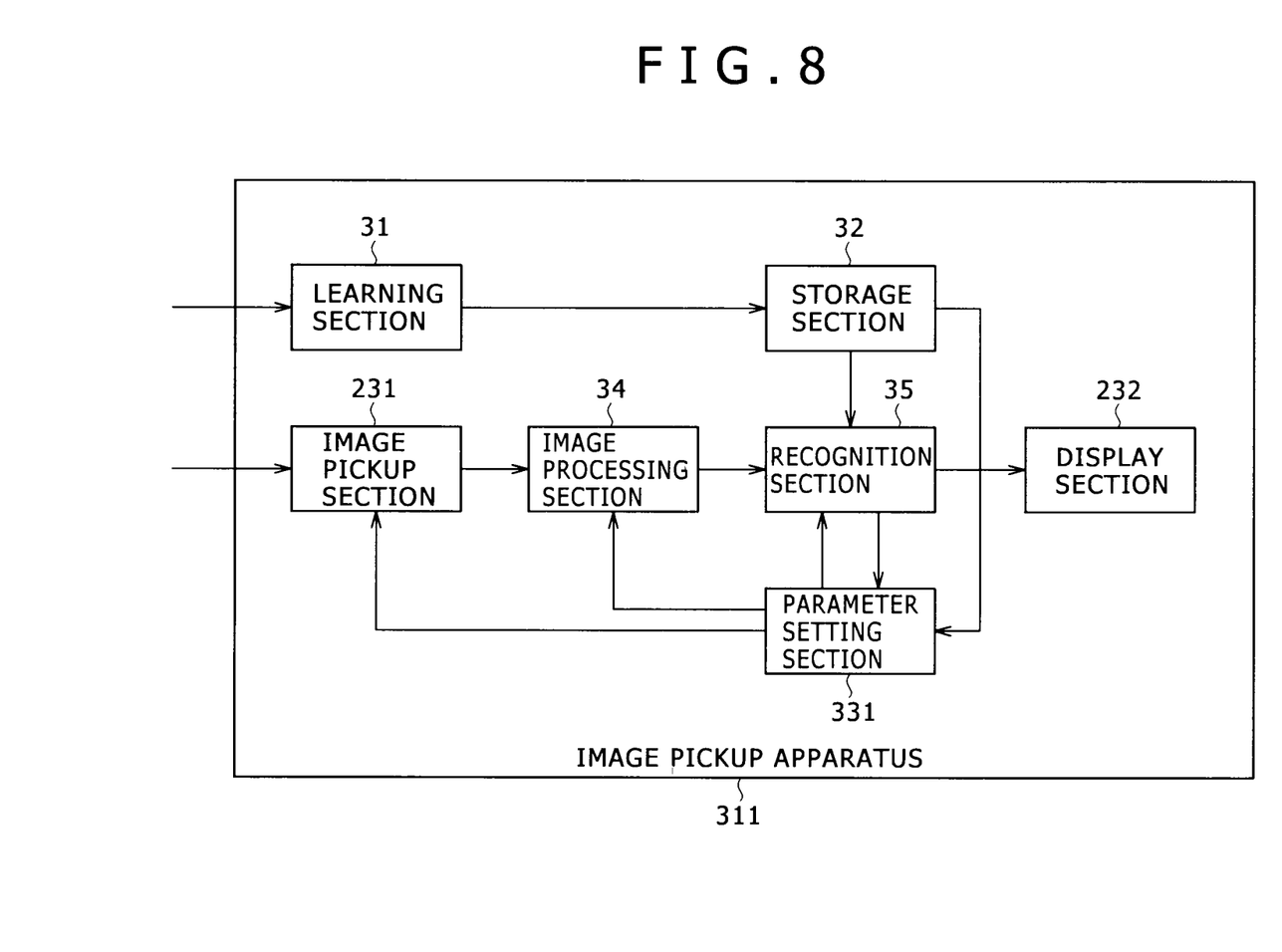
FIG. 8 is a block diagram showing another configuration of the image pickup apparatus according to the present disclosure.

FIG. 8 shows an example of a functional configuration of an image apparatus according to a fourth embodiment of the disclosed technology wherein an image processing parameter or/and a recognition processing parameter are set in addition to an image pickup parameter of an image pickup section in response to a difference in image information between an object image on an image acquired by an image pickup section and an average learning image.

Referring to FIG. 8, the image pickup apparatus 311 shown includes a learning section 31, a storage section 32, an image processing section 34, a recognition section 35, an image pickup section 231, a display section 232 and a parameter setting section 331.

It is to be noted that, while several components of the image processing apparatus 311 of FIG. 8 have similar functions to those of the image processing apparatus 211 of FIG. 6, overlapping description of such components of the similar functions is omitted herein to avoid redundancy.

In particular, the image pickup apparatus 311 of FIG. 8 is different from the image pickup apparatus 211 of FIG. 6 in that it includes the parameter setting section 331 in place of the parameter setting section 233.

The parameter setting section 331 has, in addition to a function similar to that of the parameter setting section 233 shown in FIG. 6, a function similar to that of the parameter setting section 37 shown in FIG. 1 and a function similar to that of the parameter setting section 131 shown in FIG. 4. In particular, the parameter setting section 331 reads out an average learning image from the storage section 32 in response to recognition of a predetermined object by the recognition section 35 and compares the average learning image with a region of an object recognized by the recognition section 35. Then, the parameter setting section 331 sets an image pickup parameter, an image processing parameter and a recognition processing parameter in response to a result of the comparison.

Object Detection Process of the Image Pickup Apparatus

Now, an object detection process of the image pickup apparatus 311 is described with reference to a flow chart of FIG. 9.

Figure 9:
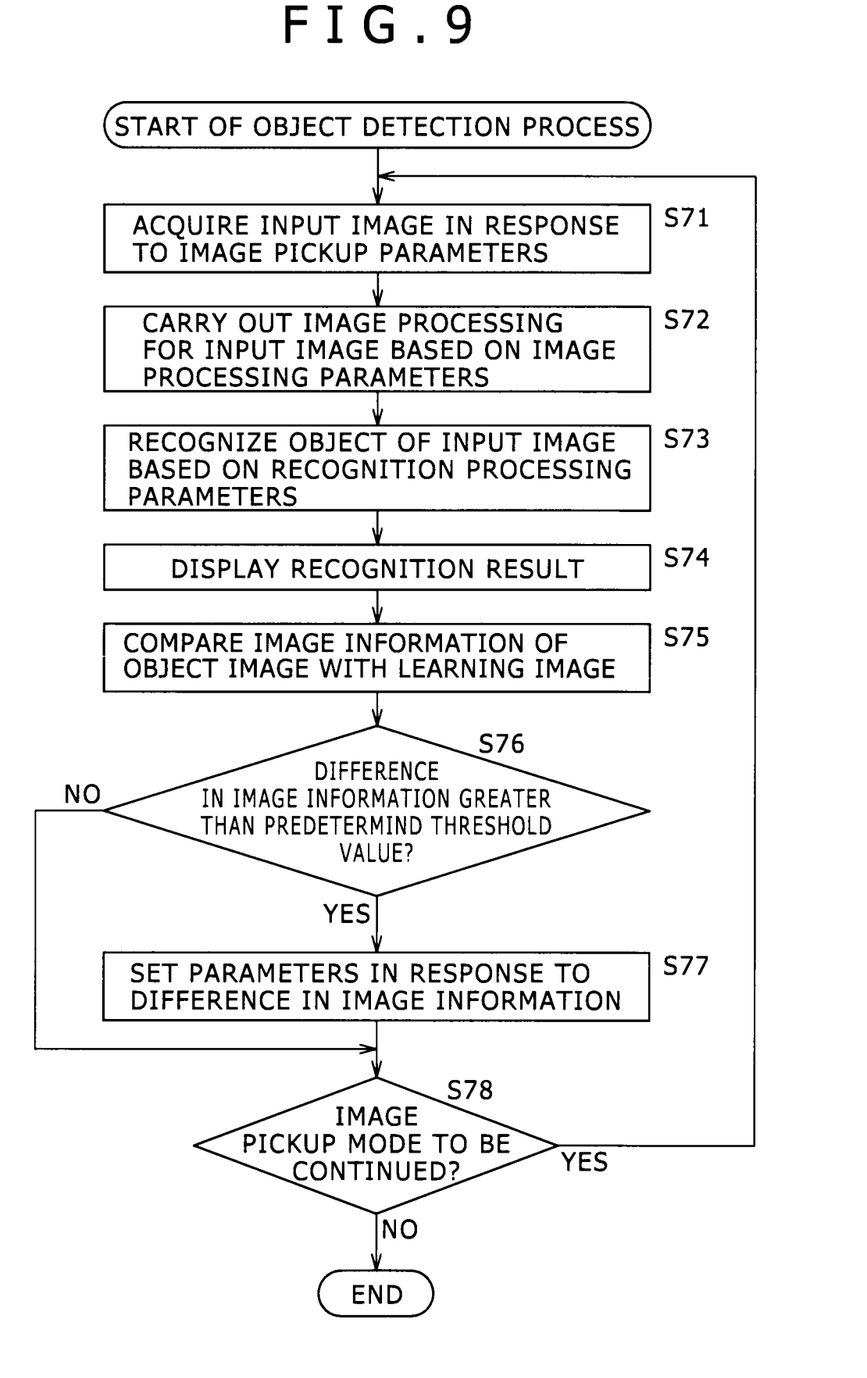
FIG. 9 is a flow chart illustrating an object detection process by the image pickup apparatus of FIG. 8.

It is to be noted that processes at steps S71, S74 to S76 and S78 of the flow chart of FIG. 9 are basically similar to the processes at steps S51, S54 to S56 and S58 of the flow chart of FIG. 7, respectively, and therefore, overlapping description of them is omitted herein to avoid redundancy.

Further, a process at step S72 of the flow chart of FIG. 9 is basically similar to the process at step S12 of the flow chart of FIG. 2 and a process at step S73 of the flow chart of FIG. 9 is basically similar to the process at step S33 of the flow chart of FIG. 5. Therefore, overlapping description of the processes at steps S72 and S73 is omitted herein to avoid redundancy.

At step S77, the parameter setting section 331 sets parameters including an image pickup parameter for the image pickup section 231, an image processing parameter for the image processing section 34 and a recognition processing parameter for the recognition section 35 in response to the difference in image information. Then, the parameter setting section 331 supplies the thus set parameters to the recognition section 35.

With the process described above, while the differences in image information between the object image of a predetermined frame of an input image and the average learning image remain greater than the predetermined threshold values, an image pickup parameter, an image processing parameter and a recognition processing parameter are set so that image pickup, an image process and a recognition process of decreasing the difference in image information between an object image of a next frame of the input image and the average learning image is carried out. Consequently, for a next frame of the input image, such image pickup, an image process and a recognition process as to cause the image information of the object image on the next frame to approach the image information of the average learning image is carried out. As a result, since the differences between the image information of the object image and the image information of the average learning image decrease, the recognition accuracy of the object can be enhanced. Further, since such an image process as to cause the image information of the object image to approach the image information of the average learning image is carried out, it is not necessary to carry out, for example, learning for a learning image having luminance information or color information corresponding to various illumination environments. In this manner, it becomes possible to detect an object with a higher degree of accuracy independently of an environment in which the object exists.

It is to be noted that, while it is described in the foregoing description that image information is luminance information and/or color information, it may be any information if it is included in an input image and an average learning image and can be compared.

Further, the object of a target substance of detection may be any other than a hand of a human being and may be a human being itself, the face of a human being, an animal such as a dog or a horse or an inanimate matter such as an automobile.

While the series of processes described above can be executed by hardware, it may otherwise be executed by software. Where the series of processes is executed by software, a program which constructs the software is installed from a program recording medium into a computer incorporated in hardware for exclusive use or, for example, a personal computer for universal use which can execute various functions by installing various programs or the like.

Figure 10:
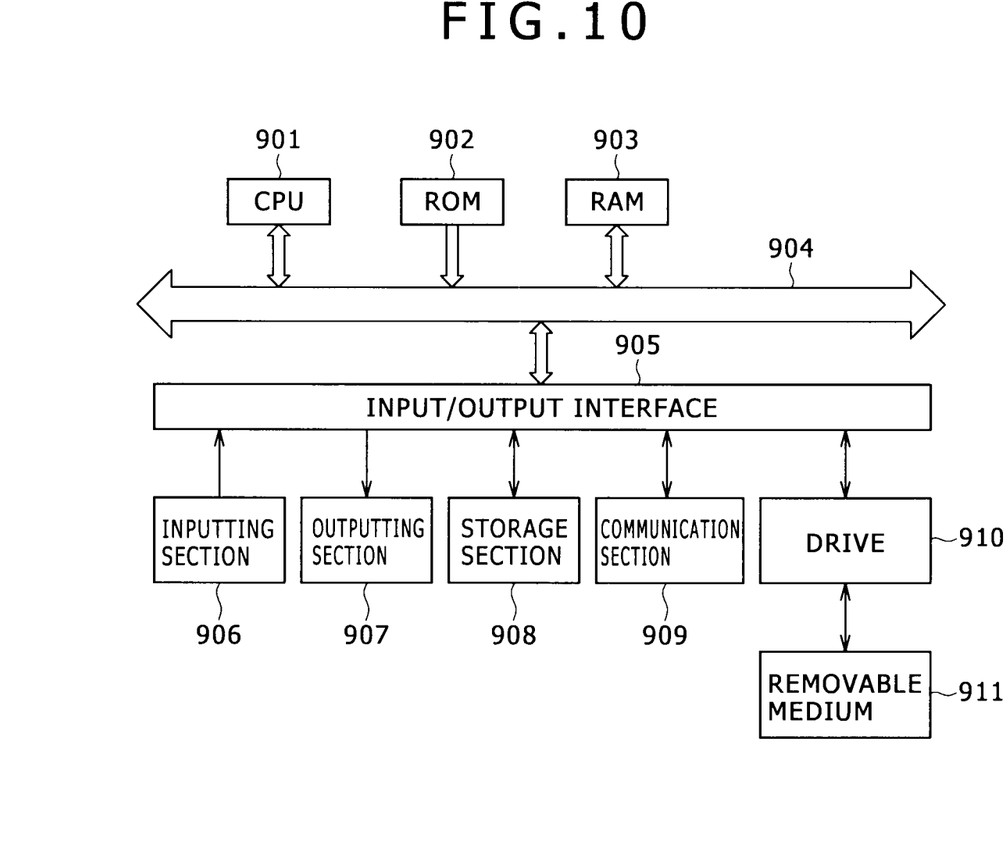
FIG. 10 is a block diagram showing an example of a hardware configuration of a computer.

FIG. 10 is a block diagram showing an example of a configuration of a personal computer which executes the series of processes described hereinabove in accordance with a program.

Referring to FIG. 10, in the computer shown, a CPU (Central Processing Unit) 901, a ROM (Read Only Memory) 902 and a RAM (Random Access Memory) 903 are connected to one another by a bus 904.

Further, an input/output interface 905 is connected to the bus 904. An inputting section 906 including a keyboard, a mouse, a microphone and so forth and an outputting section 907 including a display unit, a speaker and so forth are connected to the input/output interface 905. Further, a storage section 908 formed from a hard disk, a nonvolatile memory or the like and a communication section 909 formed from a network interface or the like are connected to the input/output interface 905. Furthermore, a drive 910 for driving a removable medium 911 such as a magnetic disk, an optical disk, a magneto-optical disk, a semiconductor memory or the like is connected to the input/output interface 905.

In the computer configured in such a manner as described above, the CPU 901 loads a program stored, for example, in the storage section 908 into the RAM 903 through the input/output interface 905 and the bus 904 and executes the program to carry out the series of processes described hereinabove.

The program to be executed by the computer or the CPU 901 is recorded into and provided as a removable medium 911 which is a package medium formed, for example, from a magnetic disk including a flexible disk, an optical disk such as a CD-ROM (Compact Disc-Read Only Memory) or a DVD (Digital Versatile Disc), a magneto-optical disk, a semiconductor memory or the like. Or the program may be provided through a wire or wireless transmission medium such as a local area network, the Internet or a digital satellite broadcast.

Then, the program can be installed into the storage section 908 through the input/output interface 905 by loading the removable medium 911 into the drive 910. Or, the program can be received by the communication section 909 through a wire or wireless transmission medium and installed into the storage section 908. Or else, the program may be installed in the ROM 902 or the storage section 908 in advance.

It is to be noted that the program to be executed by the computer may be a program whose processing is carried out in a time series in accordance with the order described hereinabove or may be a program whose processing is carried out in parallel or at a suitable timing such as when the program is called.

While preferred embodiments of the present disclosure have been described using specific terms, such description is for illustrative purposes only, and it is to be understood that changes and variations may be made without departing from the spirit or scope of the following claims.

The present disclosure contains subject matter related to that disclosed in Japanese Priority Patent Application JP 2010-163588 filed in the Japan Patent Office on Jul. 21, 2010, the entire content of which is hereby incorporated by reference.

What is claimed is:

1. An image processing apparatus, comprising:
    circuitry configured to:
        recognize, based on a learning result obtained by learning of a learning image regarding a predetermined object, an object in a predetermined frame of an input image formed from a plurality of frames which are continuous in time;
        set a parameter to be used for a process to be carried out for a later frame which is later in time than the predetermined frame of the input image in response to a difference in image information between an object image, which is an image in a region of the object recognized in the predetermined frame, and the learning image; and
        recognize the object in the later frame for which the process is carried out based on the set parameter.

2. The image processing apparatus according to claim 1, wherein the circuitry is further configured to:
    carry out a predetermined image process for the input image;
    set an image processing parameter to be used in an image process carried out for the later frame in response to the difference in image information between the object image and the learning image;
    carry out the image process for the later frame based on the set image processing parameter; and
    recognize the object in the later frame for which the image process is carried out.

3. The image processing apparatus according to claim 1, wherein the circuitry is configured to:
    set a recognition processing parameter to be used in a recognition process to be carried out for the later frame in response to the difference in image information between the object image and the learning image; and
    recognize the object in the later frame based on the set recognition processing parameter.

4. The image processing apparatus according to claim 1, wherein the circuitry is further configured to:
    pick up an image of an image pickup object to acquire the input image;
    set an image pickup parameter relating to the pick up image in response to the difference in image information between the object image and the learning image in the predetermined frame;
    acquire the input image based on the set image pickup parameter; and
    recognize the object in the acquired later frame.

5. An image processing method for an image processing apparatus which includes circuitry, the circuitry being configured to recognize, based on a learning result obtained by learning of a learning image regarding a predetermined object, an object in a predetermined frame of an input image, and to set a parameter to be used for a process to be carried out for a later frame which is later in time than the predetermined frame of the input image in response to a difference in image information between an object image, which is an image in a region of the object recognized in the predetermined frame, and the learning image, the method comprising:
    recognizing, by the circuitry, based on the learning result obtained by learning of the learning image regarding the predetermined object, the object in the predetermined frame of the input image; and
    setting a parameter to be used for a process to be carried out for a later frame which is later in time than the predetermined frame of the input image in response to a difference in image information between an object image, which is an image in a region of the object recognized in the predetermined frame, and the learning image, wherein
    the object in the later frame for which the process is carried out is based on the parameter set by the setting step being recognized at the recognizing step.

6. A non-transitory computer readable medium having a computer program recorded thereon, the computer program configured to perform a method when executed on a computer, the method comprising:
    recognizing, based on a learning result obtained by learning of a learning image regarding a predetermined object, an object in the predetermined frame of the input image; and
    setting a parameter to be used for a process to be carried out for a later frame which is later in time than the predetermined frame of the input image in response to a difference in image information between an object image, which is an image in a region of the object recognized in the predetermined frame, and the learning image, wherein
    the object in the later frame for which the process is carried out is based on the parameter set by the setting step being recognized at the recognizing step.

* * * * *